United States Patent [19]

Yen et al.

[11] Patent Number: 5,755,388
[45] Date of Patent: May 26, 1998

[54] WASTE TIRE TREATING APPARATUS

[76] Inventors: Chin-Ching Yen, 2F. No. 499, Ying-Tsai Road, Taichung; Chih-Ming Lee, 3F, No. 92, Min-Chuan First Road, Kaohsiung, both of Taiwan

[21] Appl. No.: 760,998
[22] Filed: Dec. 5, 1996
[51] Int. Cl.$^6$ ............................................. B02C 19/12
[52] U.S. Cl. ........................... 241/41; 241/65; 241/157; 241/DIG. 31
[58] Field of Search .......................... 241/41, 65, 79, 241/157, DIG. 31

[56] References Cited

U.S. PATENT DOCUMENTS

| | | | |
|---|---|---|---|
| 3,966,125 | 6/1976 | Finkbeiner | 241/14 |
| 4,025,990 | 5/1977 | Lovette, Jr. | 241/14 |
| 4,240,587 | 12/1980 | Letsch | 241/23 |
| 4,813,614 | 3/1989 | Moore et al. | 241/23 |
| 5,286,374 | 2/1994 | Chen | 241/DIG. 31 X |
| 5,524,838 | 6/1996 | Ellers et al. | 241/23 |
| 5,634,599 | 6/1997 | Khais et al. | 241/23 |

*Primary Examiner*—John M. Husar
*Attorney, Agent, or Firm*—Morton J. Rosenberg; David L. Klein; Jun Y. Lee

[57] ABSTRACT

A waste tire treating apparatus is disclosed. It includes a grinding device for grinding the waste tire into blocks with smaller volume, a washing device for washing the ground waste tire, a drying device for drying the washed waste tire, a granulating device for cutting and granulating the dried waste tire into granules with predetermined volume, a heating device for heating and melting the waste tire granules and a sorting device disposed under the heating device for receiving the molten rubber and nylon fibers and the steel filaments of the waste tire. The sorting device includes a channel with circulated water flow, whereby the mixture of the rubber and nylon fibers float on the water, while the steel filaments precipitate onto the bottom of the channel to be separately recovered.

1 Claim, 2 Drawing Sheets

First step: using a grinding device to grind the waste tire into blocks or cubes with smaller volume

Second step: using a washing device to wash the ground waste tire blocks

Third step: using a drying device to dry the washed waste tire blocks

Fourth step: using a granulating device to cut and granulate the dried waste tire blocks into granules with predetermined volume

Fifth step: using a heating device to heat and melt the rubber and nylon fiber of the waste tire in a close furnace

Sixth step: using a sorting device including a channel with circulated water flow to receive the molten rubber and nylon fibers and the steel filaments of the waste tire whereby the rubber and nylon fibers float on the water, while the steel filaments precipitate onto the bottom of the channel

FIG. 1

WASTE TIRE TREATING APPARATUS

BACKGROUND OF THE INVENTION

The present invention relates to a waste tire treating apparatus. By using a baking and heating method, it can separate the rubber and nylon fibers from the steel filaments of the waste tire and can respectively recovering the same.

The compositions of a general tire include rubber, nylon fibers and steel filaments. Because this rubber had been processed with sulfurating and heating treatment, when burning the waste tire, heavy toxic gases including dioxin, polychlorobenzene, etc. will be produced. Thus, these toxic gases will pollute the environment and harm human body.

SUMMARY OF THE INVENTION

In order to obviate the above-mentioned problem, it is a primary object of the present invention to provide a waste tire treating apparatus. By using a baking and heating method in a close furnace to melt the rubber and nylon fiber compositions of the waste tire, whereby the molten rubber and nylon fibers flow out and separate from the steel filaments for respective recovering. Therefore, no toxic gas is produced in the treating procedure so that the environment is prevented from being polluted and the human body is protected from being harmed.

To achieve the above object, the waste tire treating apparatus including:

- a grinding device located at a material feeding end of the apparatus for grinding the waste tire into blocks or cubes with smaller volume;
- a washing device disposed behind the grinding device for washing the ground waste tire;
- a drying device disposed behind the washing device for drying the washed waste tire;
- a granulating device disposed behind the drying device for cutting and granulating the dried waste tire into granules with predetermined volume;
- a heating device disposed behind the granulating device, including a close furnace in which the rubber and nylon fiber compositions of the waste tire granules are heated and molten; and
- a sorting device disposed under the heating device, including a channel with circulated water flow for receiving the molten rubber and nylon fibers and the steel filaments of the waste tire. The mixture of the rubber and nylon fibers float on the water, while the steel filaments precipitate onto the bottom of the channel to be separately recovered.

The present invention can be best understood through the following description and accompanying drawing, wherein:

BRIEF DESCRIPTION OF THE DRAWINGS

FIG. 1 is a flow chart of the present invention; and

DETAILED DESCRIPTION OF THE PREFERRED EMBODIMENT

Figure 2:
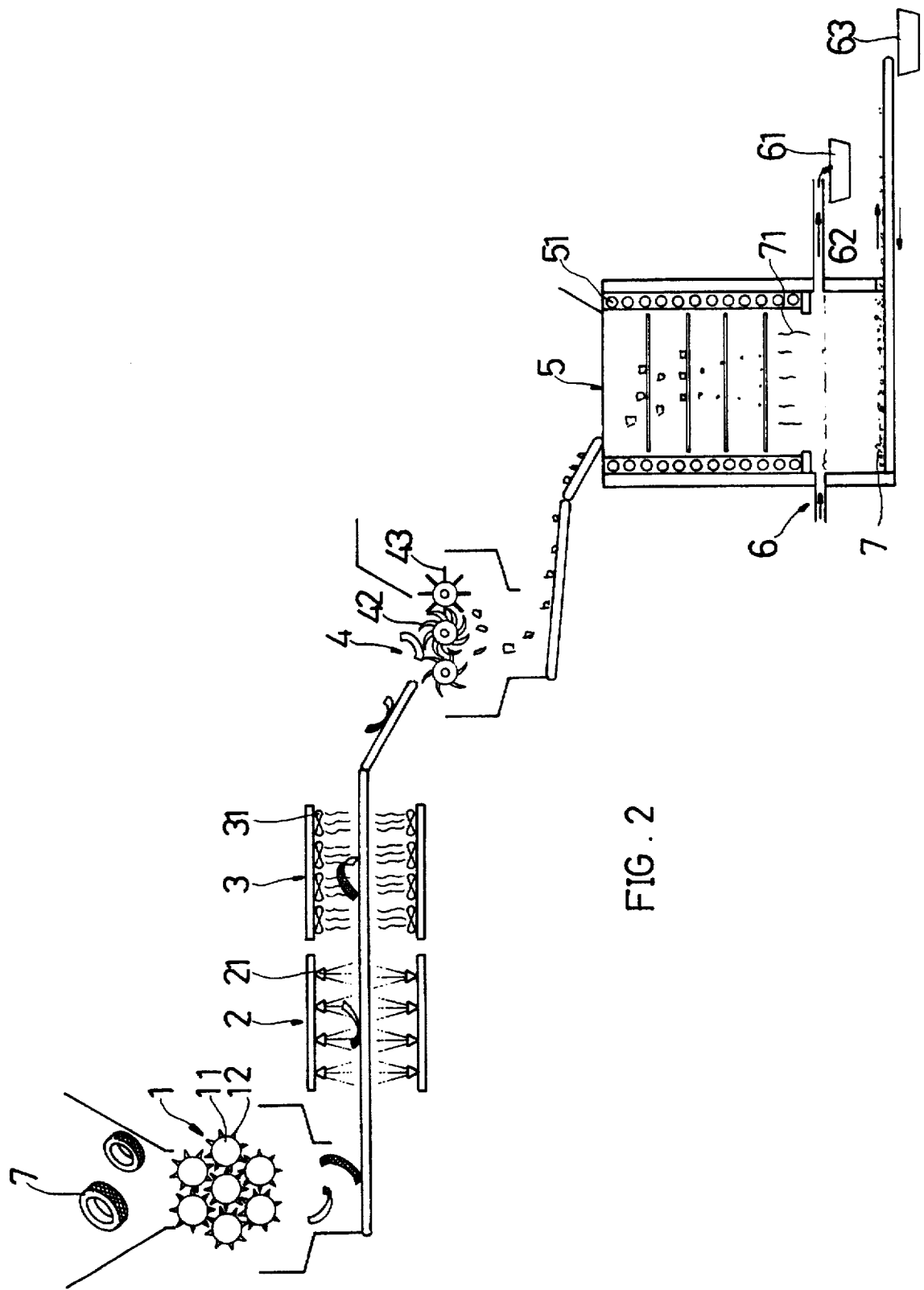
FIG. 2 shows the structural arrangement of the present invention.

Please refer to FIGS. 1 and 2. The waste tire treating apparatus of the present invention includes a grinding device 1, a washing device 2, a drying device 3, a granulating device 4, a heating device 5 and a sorting device 6.

The grinding device 1 is located at a material feeding end of the apparatus, having multiple rotatable grinding shafts 11. Each grinding shaft 11 is disposed with multiple sharp projections 12 for piercing through and destroying the waste tire 7 into blocks or cubes with predetermined volume.

The washing device 2 is located behind the grinding device 1, including strong sprinklers 21 for washing the ground waste tire 7.

The drying device 3 is located behind the washing device 2, having electric fans 31 for conducting external air inward to blow and dry the washed waste tire 7.

The granulating device 4 is located behind the drying device 3, including two sets of interlaced cutting blades 41, 42 which are reversely rotatable. On one side of one set of cutting blades 42 is disposed a driving shaft 43 rotating in the same direction as the cutting blades 42. The driving shaft 43 is positioned at lower ends of the cutting blades 42 and interlaced therewith for cutting and granulating the waste tire 7 into granules with predetermined volume.

The heating device 5 is located behind the granulating device 4, including a close furnace in which resistors 51 are disposed to bake and heat the waste tire granules contained in the furnace. The heating temperature is slightly higher than the melting point of the rubber and nylon fiber compositions of the waste tire 7 and preferably within about 255° C. to 265° C. The furnace can be filled with gaseous nitrogen to avoid any ignition of the waste tire 7.

The rubber does not melt at a fixed point and will be softened within 130° C. to 140° C. Within 150° C. to 160° C., the rubber will have apparent viscosity. The rubber starts to decompose from about 200° C. and melts at 220° C. Nylon fiber No. 6 has a softening point of 180° C. and a melting point within 215° C. to 220° C. Nylon fiber No. 66 has a softening point of 234° C. and a melting point within 255° C. to 260° C. Therefore, to ensure that the tire composed of rubber and nylon fiber No. 6 and the tire composed of rubber and nylon fiber No. 66 can be both molten, the heating temperature is preferably set within 255° C. to 265° C.

The sorting device 6 is located under (or beneath) the heating device 5, including a channel with circulated water flow for receiving the mixture 71 of the molten rubber and nylon fiber and the steel filaments 72. The mixture 71 dropping onto the water is quickly cooled and entrained by the water flow to a rubber collecting portion 61. While the steel filaments 72 with greater specific weight precipitate onto the bottom of the channel to be transferred from the channel to a steel filament collecting portion 63 by a conveyor 62 disposed in the channel.

According to the above arrangement, the present invention has the following advantages:

1. No pollution. The rubber and nylon fibers are directly heated by way of electrical baking at a high temperature of approximately 265° C. without ignition or burning. Therefore, no toxic waste gas is produced to pollute the environment or harm human body.
2. Simple operation. The present invention automatically and continuously transfers the waste tire by a unified operation so that the waste tire is treated at very high efficiency. Also, each step is monitored and controlled by an electronic control unit so that the operation is performed reliably.

It is to be understood that the above description and drawings are only used for illustrating one embodiment of the present invention, not intended to limit the scope thereof. Any variation and derivation from the above description and drawings should be included in the scope of the present invention.

What is claimed is:

1. A waste tire treating apparatus comprising:

a grinding device located at a material feeding end of the apparatus, said grinding device having multiple sets of rotatable grinding shafts, each grinding shaft being disposed with multiple sharp projections for piercing through and grinding a waste tire into blocks or cubes;

a washing device located adjacent said grinding device, said washing device including a multiplicity of strong sprinklers for washing the ground waste tire;

a drying device located adjacent said washing device and having a plurality of electric fans, said electric fans serving to draw in external air to blow on and thereby dry the washed waste tire;

a granulating device located adjacent said drying device said granulating device including two sets of interlaced cutting blades which are reversely rotatable, a driving shaft is disposed on one side of one set of said cutting blades and rotates in a direction matching that of said set of cutting blades, said driving shaft being positioned at lower ends of said cutting blades and interlaced therewith for cutting and granulating the waste tire into granules of predetermined volume;

a heating device located adjacent said granulating device and including a close furnace having a plurality of heating units disposed therein, each of said plurality of heating units being formed by an electric resistor for heating the waste tire granules contained in said furnace, said furnace having a heating temperature within an approximating range of 255° C. to 265° C. for melting rubber and nylon fiber compositions of the waste tire; and, a sorting device disposed below said heating device for separating the melted rubber and nylon fibers from steel filaments of the waste tire, said sorting device including a channel with circulating water flow, the molten rubber and nylon fibers dropping into said water flow in said channel and being quickly cooled and carried by said water flow to a rubber collecting portion, the steel filaments with greater specific weight sink to a bottom surface of said channel for transfer from said channel to a steel filament collecting portion by a conveyor disposed in said channel.

* * * * *